United States Patent
Honjo et al.

(10) Patent No.: US 9,564,101 B2
(45) Date of Patent: Feb. 7, 2017

(54) DISPLAY DEVICE, METHOD OF DISPLAY, AND PROGRAM

(71) Applicant: CASIO COMPUTER CO., LTD., Tokyo (JP)

(72) Inventors: Taichi Honjo, Tokyo (JP); Taiga Murayama, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 163 days.

(21) Appl. No.: 14/533,356

(22) Filed: Nov. 5, 2014

(65) Prior Publication Data
US 2015/0154944 A1   Jun. 4, 2015

(30) Foreign Application Priority Data
Nov. 29, 2013 (JP) ................................. 2013-246857

(51) Int. Cl.
G09G 5/00 (2006.01)
H04N 9/31 (2006.01)
G03B 21/10 (2006.01)
G06T 13/40 (2011.01)

(52) U.S. Cl.
CPC .............. *G09G 5/00* (2013.01); *H04N 9/3194* (2013.01); *G03B 21/10* (2013.01); *G03B 2206/00* (2013.01); *G06T 13/40* (2013.01); *G09G 2340/045* (2013.01); *G09G 2340/0464* (2013.01); *G09G 2340/14* (2013.01); *G09G 2380/06* (2013.01); *H04N 9/3185* (2013.01)

(58) Field of Classification Search
None
See application file for complete search history.

(56) References Cited

U.S. PATENT DOCUMENTS

| 2008/0112648 A1* | 5/2008 | Hatano | G06K 9/00228 382/298 |
| 2010/0097379 A1* | 4/2010 | Choi | G09G 5/363 345/428 |
| 2013/0141456 A1* | 6/2013 | Sokolov | G06F 3/14 345/620 |
| 2014/0306966 A1* | 10/2014 | Kuo | G09G 5/12 345/502 |

FOREIGN PATENT DOCUMENTS

JP   2011-150221 A   8/2011

* cited by examiner

*Primary Examiner* — Ke Xiao
*Assistant Examiner* — Jed-Justin Imperial
(74) *Attorney, Agent, or Firm* — Chen Yoshimura LLP (57) ABSTRACT

In a digital signage device, a control unit extracts a face region and a torso region from an image of the object to be displayed, compares the extracted face region and torso region to a face region and torso region extracted from a screen image on an image display unit in use, and then calculates, on the basis of these comparison results, a first adjustment factor for adjusting the size of the face region and a second adjustment factor for adjusting the size of the torso region in the image of the object to be displayed, the respective sizes of the face region and torso region in the image of the object to be displayed being separately adjusted on the basis of the calculated first adjustment factor and second adjustment factor in order to display an adjusted image on the image display unit.

12 Claims, 3 Drawing Sheets

DISPLAY DEVICE, METHOD OF DISPLAY, AND PROGRAM

BACKGROUND OF THE INVENTION

Technical Field

The present invention relates to a display device, a method of display, and a program.

Background Art

Conventionally, an image output device mounting apparatus is known to have: an image output device that connects to an image supplying device; a reflective member; and a screen. Output light that contains content and is outputted from the image output device is reflected by the reflective member, and the output light reflected from the reflective member is projected onto a screen formed in the shape of the content, thereby allowing for a heightened impression elicited by the viewer (see Patent Document 1, for example).

RELATED ART DOCUMENT

Patent Document

Patent Document 1: Japanese Patent Application Laid-Open Publication No. 2011-150221

SUMMARY OF THE INVENTION

The image output mounting device described in Patent Document 1 displays a human image that has been modified to fit the shape of a screen, with the screen itself having a human shape. A more flexible method of using this type of device, however, would be to suitably choose the human image to be projected in accordance with content such as reproduction timing from a plurality of human images that have been taken and then display this image without regard for the shape of the screen. At such a time, the amount of attention attracted would increase if the human image were to be displayed proportionately on the display area of the screen or the like, but if an image that has not been configured for this display area, which is formed into a prescribed shape, is displayed, then the amount of blank space on the screen will increase and the amount of attention attracted will be reduced.

An aim of the present invention is to make it possible to display an image of the object to be displayed as proportionately as possible on a display area.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a display device, including: a display unit having at least a first display area and a second display area; a storage unit that stores display area information for specifying respective shapes and sizes of the first display area and the second display area of the display unit; and a control unit connected to the display unit and the storage unit, the control unit configured to: extract a first region and a second region respectively corresponding to the first display area and the second display area from an image of the object to be displayed by the display unit; compare the first region and the second region extracted from the image of the object to be displayed to the first display area and the second display area specified on the basis of the display area information, the control unit calculating, on the basis of this comparison, a first adjustment factor for adjusting a size of the first region and a second adjustment factor for adjusting a size of the second region; adjust the respective sizes of the first region and the second region of the image of the object to be displayed in accordance with the calculated first adjustment factor and the second adjustment factor; and cause the display unit to display the adjusted image of the object to be displayed.

In one aspect, the present disclosure provides a method of display for a display device equipped with a display unit having at least a first display area and a second display area, the method including: storing display area information for specifying respective shapes and sizes of the first display area and the second display area of the display unit; extracting a first region and a second region respectively corresponding to the first display area and the second display area from a image of the object to be displayed to be displayed by the display unit; calculating a first adjustment factor for adjusting a size of the first region and a second adjustment factor for adjusting a size of the second region, the calculating being performed on the basis of a comparison in which the first region and the second region extracted from the image of the object to be displayed are compared to the first display area and the second display area specified on the basis of the display area information; adjusting the respective sizes of the first region and the second region of the image of the object to be displayed in accordance with the calculated first adjustment factor and the second adjustment factor; and causing the display unit to display the image of the object to be displayed that has been adjusted.

In one aspect, the present disclosure provides a non-transitory storage medium that stores instructions executable by a processor in a display device equipped with a display unit having at least a first display area and a second display area, the instructions causing the display device to perform the following: storing display area information for specifying respective shapes and sizes of the first display area and the second display area of the display unit; extracting a first region and a second region respectively corresponding to the first display area and the second display area from a image of the object to be displayed to be displayed by the display unit; calculating a first adjustment factor for adjusting a size of the first region and a second adjustment factor for adjusting a size of the second region, the calculating being performed in accordance with a comparison in which the first region and the second region extracted from the image of the object to be displayed are compared to the first display area and the second display area specified in accordance with the display area information; adjusting the respective sizes of the first region and the second region of the image of the object to be displayed in accordance with the calculated first adjustment factor and the second adjustment factor; and causing the display unit to display the image of the object to be displayed that has been adjusted.

According to present invention, the image of the object to be displayed can be displayed as proportionately as possible on a display area.

It is to be understood that both the foregoing general description and the following detailed description are exem-

DETAILED DESCRIPTION OF EMBODIMENTS

Preferable embodiments of respective aspects of the present invention will be described in detail below with reference to the attached drawings. The present invention is not limited to the examples shown in the drawings.

<Configuration of Digital Signage Device 1>

Figure 1:
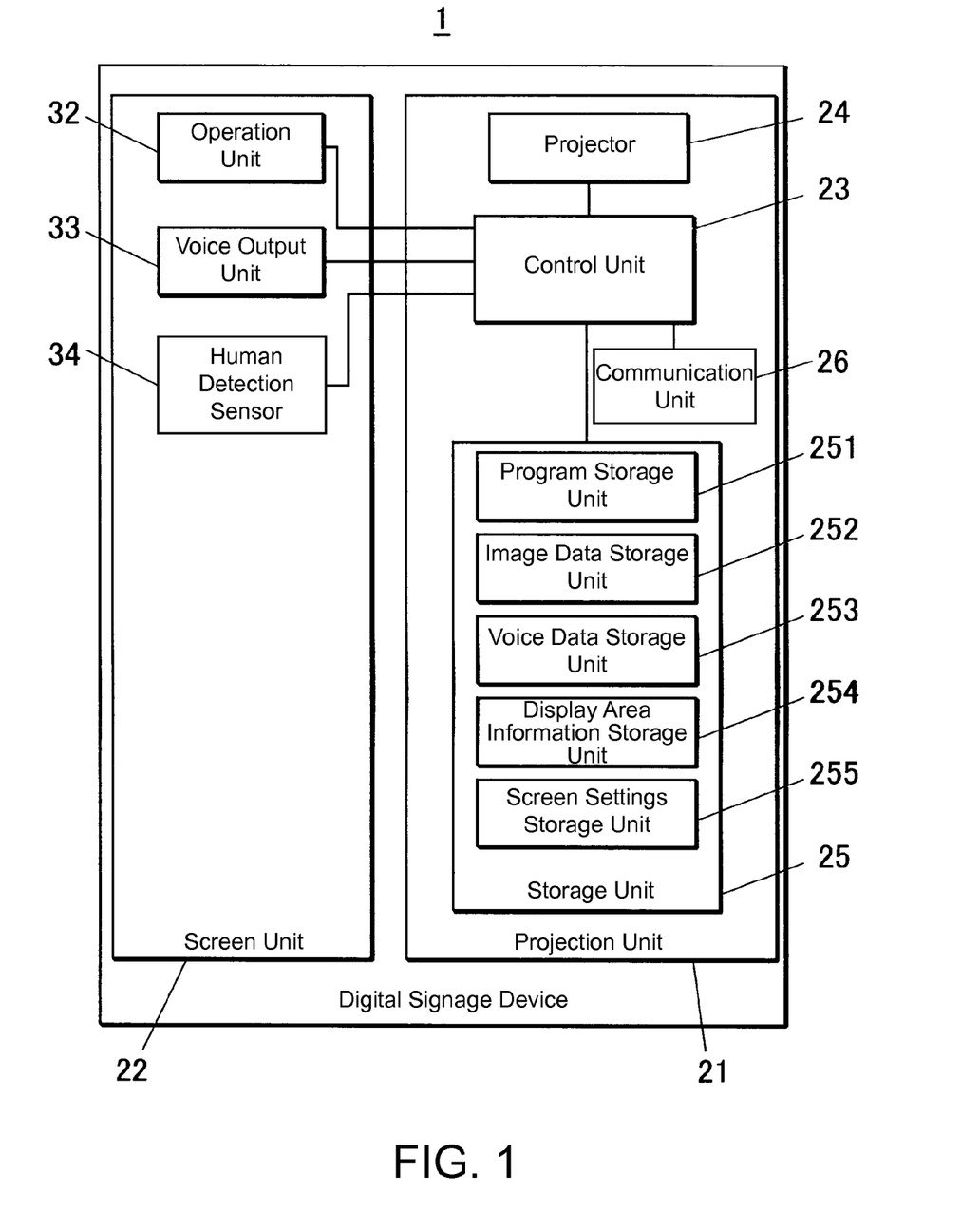
FIG. 1 is a block view of the functional configuration of a digital signage device of the present embodiment.

FIG. 1 is a block view of the primary control configuration of the digital signage device 1, which is a display device of the present embodiment. The digital signage device 1 may be placed in a store, exhibition venue, or the like, and reproduce content such as product descriptions, guidance, or surveys, or be placed in a care facility or the like and reproduce quiz content to encourage mental fitness, for example. The uses of the digital signage device 1 are not limited to the above. In the present embodiment, "content" means a human being performing some type of explanation, guidance, questioning, or the like, but is not limited to these.

As shown in FIG. 1, the digital signage device 1 includes a projection unit 21 for emitting image light that contains content, and a screen unit 22 that receives this image light emitted from the projection unit 21 from behind and projects this light forward.

First, the projection unit 21 will be explained.

The projection unit 21 includes a control unit 23, a projector 24, a storage unit 25, and a communication unit 26. The projector 24, the storage unit 25, and the communication unit 23 are connected to the control unit 23, as shown in FIG. 1.

The control unit 23 has a CPU (central processing unit) that runs various types of programs stored in the storage unit 25 for controlling prescribed computations and units, and a memory that serves as the work area when the programs are being run (neither is shown). The control unit 23 functions as an extraction unit, a calculation unit, an adjustment unit, and a display control unit through cooperation with programs stored in the program storage unit 251 of the storage unit 25. The memory inside the control unit 23 functions as a storage unit.

The projector 24 is a projection device that converts image data outputted from the control unit 23 into image light and uses this light to illuminate the rear side of the screen unit 22. The projector 24 can be a DLP (digital light processing) (registered trademark) projector that uses a DMD (digital micromirror device), which is a display device that has a plurality (if XGA, 1024 pixels×768 pixels) of micromirrors each tilted at different angles and that turns ON/OFF at rapid speed to form optical images from reflected light, for example. When the image of the object to be displayed is a human being in an image, as in the present embodiment, then the micromirrors in a position corresponding to the human being region turn ON, and the other regions turn OFF, thereby making it possible to only project (display) the human being region.

The storage unit 25 is constituted of an HDD (hard drive disk), non-volatile semiconductor memory, or the like. As shown in FIG. 1, the storage unit 25 has a program storage unit 251, an image data storage unit 252, a voice data storage unit 253, a display area information storage unit 254, a screen setting storage unit 255, and the like.

The program storage unit 251 stores system programs and various types of processing programs executed by the control unit 23, and the necessary data and the like for running these programs.

The image data storage unit 252 stores image data of a photographic image of a human being that is a potential image of the object to be displayed for an image display unit 27 at the time of content reproduction. A plurality of human being images may be included in a single photographic image.

The voice data storage unit 251 stores text data used for voice output of content.

The display area information storage unit 254 stores, in accordance with identification information for the plurality of interchangeable image display units 27 having a human shape (see FIG. 2), information identifying at least the shape and size of a face region 27a and a torso region 27c in the display area (the area of the entire screen) on the respective image display units 27. In the present embodiment, the display area information contains photographed images of the respective image display units 27 (images that have been photographed from behind the image display unit 27 when this unit is illuminated by the projector 24; the inside of the display area in the image display unit 27 is white, and the background is black), and when the photographed image is projected onto the image display unit 27 at a prescribed projection power and projection time, an image is photographed in which the region of the projection image and the display area of the image display unit 27 coincide with each other (called a "screen image"). The display area information, however, is not limited to this. The screen image may be binarized and used as an image or the like having a pre-extracted face region and torso region, for example.

The screen setting storage unit 255 stores the currently active identification information for the image display unit 27, or in other words, stores the identification information for the image display unit 27 that will be used during the next content reproduction. The currently active image display unit 27 can be configured by prescribed operations or the like of an operation unit 32, which is a settings unit, and the screen setting storage unit 255 stores screen identification information in accordance with this setting operation.

The communication unit is constituted of a modem, router, networker card, and the like, and communicates with external devices.

Next, the screen unit 22 will be explained.

Figure 2:
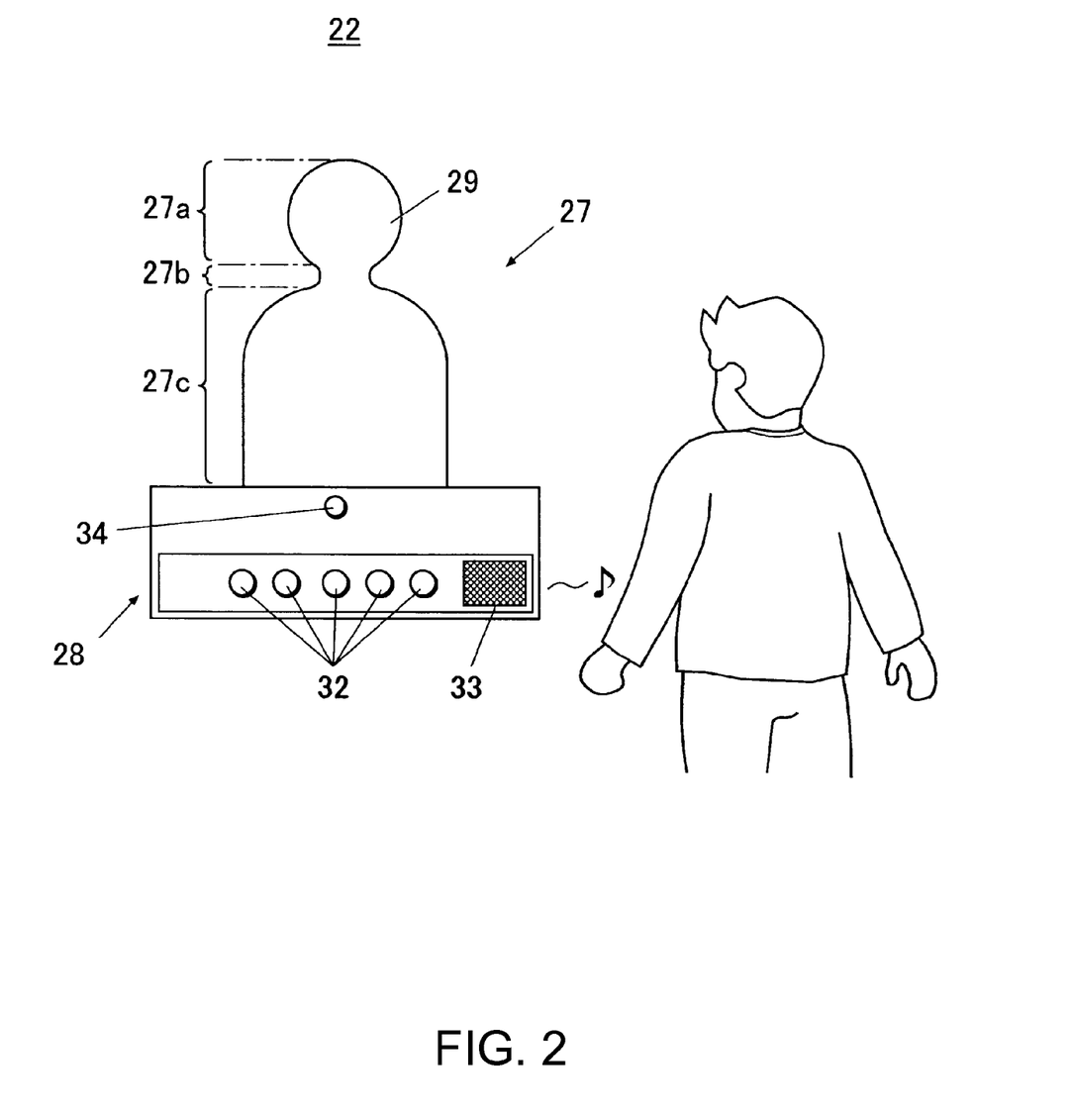
FIG. 2 is a view of the schematic configuration of the screen unit in FIG. 1.

FIG. 2 is a front view of a schematic configuration of the screen unit. As shown in FIG. 2, the screen unit 22 includes the image display unit 27, and a base 28 that supports the image display unit 27.

The image display unit 27 is a screen in which film screens for rear projection have been stacked onto a single transmissive plate 29, such as an acrylic plate, formed in a human shape. This transmissive plate 29 is disposed so as to be substantially orthogonal to the illumination direction of the image light. As shown in FIG. 2, the image display unit 27 can be divided into three regions: the face region 27a (the first display area); a neck region 27b (the third display area); and the torso region 27c (the second display area). A display unit is formed by this image display unit 27 and the projector 24 described above. The image display unit 27 has a plurality of potential shapes and can switch between these.

The button-operated operation unit 32, a voice output unit 33 such as a speaker that outputs a voice, a human-detection sensor 34 and the like are disposed on the base 28. Using the operation unit 32, it is possible to configure (select) the image display unit 27 to be used in the next projection from the plurality of switchable image display units 27. As shown in FIG. 1, the operation unit 32, the voice output unit 33, and the human-detection sensor 34 are connected to the control unit 23.

<Operation of Digital Signage Device 1>

Next, the operation of the digital signage device 1 will be explained.

Figure 3:
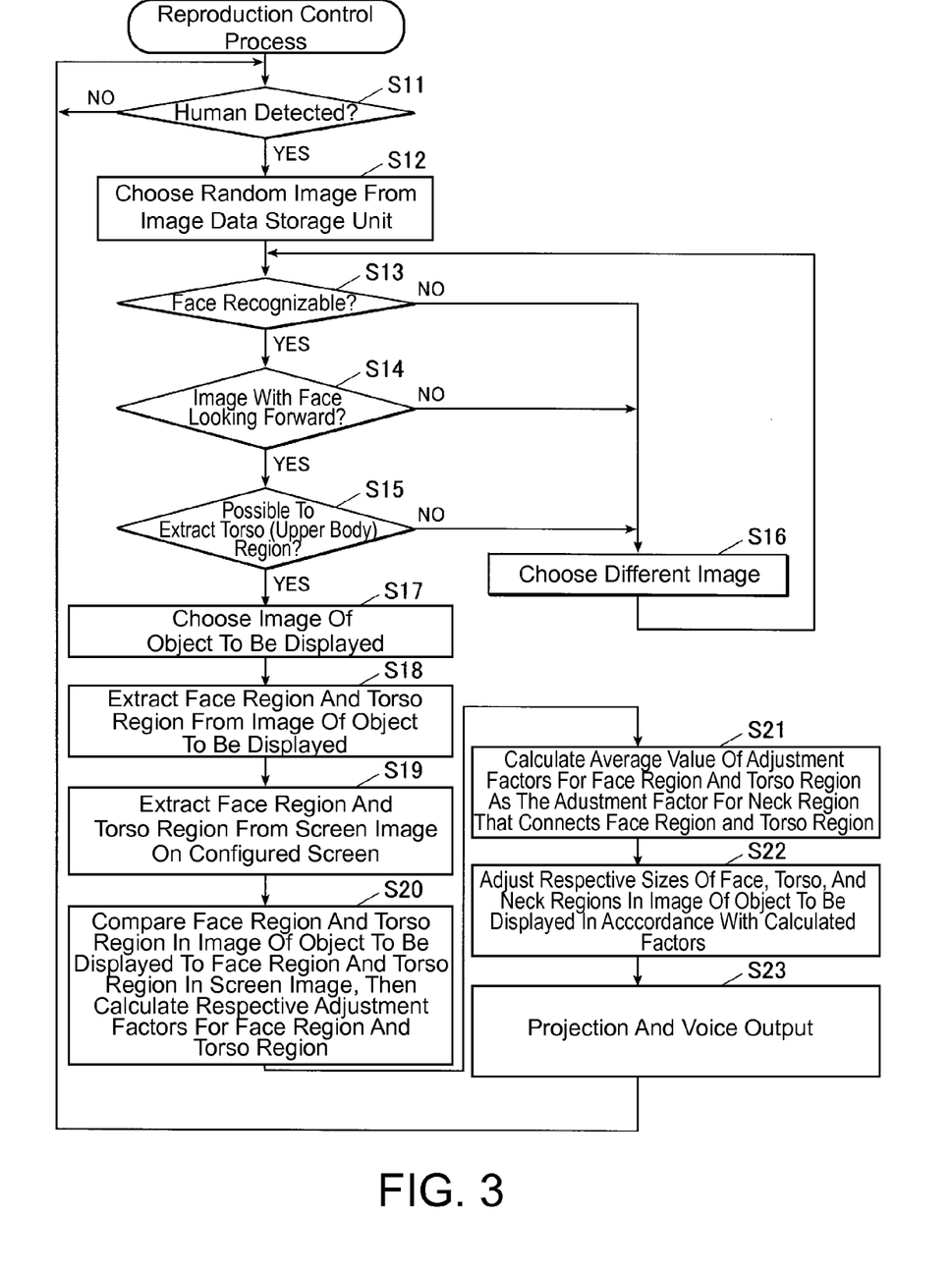
FIG. 3 is a flow chart of a reproduction control process executed by the control unit in FIG. 1

FIG. 3 is a flowchart of the reproduction control process that is run in the digital signage device 1. The reproduction control process is run through cooperation with the control unit 23 and the programs stored in the program storage unit 251.

First, the control unit 23 is in standby while waiting for a person to be detected by the human-detection sensor 34 (step S11). When a person is detected by the human-detection sensor 34 (YES in step S11), the control unit 23 chooses an image at random from the photographed images stored in the image data storage unit 252 and reads the image to memory (step S12). The method of choosing the image in step S12 is not limited to this, and the user may choose an image, or a prescribed image for certain time slots can be chosen, for example.

Next, the control unit 23 performs face recognition processing on the photographed image that has been selected in order to determine whether or not the image is a facial image (step S 13). The facial recognition process can use well-known image processing techniques based on features of the eyes, nose, mouth, and the like.

If a facial image cannot be recognized from the selected photographed image (NO in step S13), the control unit 23 selects a different image from the photographed images stored in the image data storage unit 252 (step S16) and returns to the process in step S13.

If a facial image has been recognized from the photographed image that has been selected (YES in step S13), the control unit 23 determines whether or not the face in the facial image is facing forward (step S14). It is possible to determine whether the face is facing forward by comparing the length of the left and right eyes in the recognized facial image, for example. If the face in the facial image is not facing forward (NO in step S14), the control unit 23 selects a different image from the photographed images stored in the image data storage unit 252 (step S16) and returns to step S13.

If it is determined that the face in the facial image is facing forward (YES in step S14), the control unit 23 determines whether a body (upper body) region corresponding to the forward-facing facial image can be extracted from the photographed image (step S15). When a human figure including a facial image facing forward is extracted from a photographed image and the length of the extracted region in the vertical direction is a certain multiplier of the length of the face region in the vertical direction, it can be determined that a torso region has been extracted.

If a torso region corresponding to the forward-looking facial image is not able to be extracted (NO in step S15), the control unit 23 selects a different image from the photographed images stored in the image data storage unit 252 (step S16) and returns to step S13.

On the other hand, if a torso region corresponding to the forward-looking facial image is able to be extracted (YES in step S 15), the control unit 23 uses the image of the human being in which the torso region was able to be extracted as the image of the object to be displayed (step S17). If there are a plurality of images of the human being in which the torso region was able to be exacted, one is selected to be used as the image of the object to be displayed.

Next, the control unit 23 extracts the face region (the first region) and the torso region (the second region) from the human being image chosen as the image of the object to be displayed and divides the face region and the torso region (step S18). Next, the control unit 23 reads out the screen image corresponding to the identification information stored in the screen setting storage unit 255 from the display area information storage unit 254 and stores this in the memory, and individually extracts the face region and the torso region from the read-out screen image. The screen image is binarized and a screen region is extracted, and a substantially circular top region of the extracted screen region is extracted as the face region, and a substantially rectangular lower region is extracted as the torso region, for example.

Next, the control unit 23 compares the face region and torso region of the image of the object to be displayed extracted in step S17 with the face region and torso region extracted from the screen image, and calculates an adjustment factor (first adjustment factor) for the face region and an adjustment factor (second adjustment factor) for the torso region in the image of the object to be displayed (step S20). The adjustment factor is the largest size at which the face region and torso region do not protrude from the face region 27a and the torso region 27c on the image display unit 27 during projection (display) on the image display unit 27, which is based on the image of the object to be displayed adjusted by this adjustment factor. Specifically, the face region in the image of the object to be displayed is expanded and shrunk to see if either the length or width of the face region protrudes from the face region in the screen image when aligned with the face region in the screen image. During this, the value when there is no protrusion from the face region in the screen image is calculated as the factor for the face region. The factor for the torso region is calculated in a similar manner.

Next, the control unit 23 calculates the average value of the adjustment factor of the face region and the torso region as the adjustment factor (third adjustment factor) for the neck region (third region), which is the connecting unit of the face region and the torso region (step S21).

The control unit 23 adjusts (zooms) the size of the face region, torso region, or neck region extracted from the image of the object to be displayed on the basis of the adjustment factors (step S22). The neck region has the center unit thereof (center in the vertical direction), which is the midpoint between the boundary of the face region and the boundary of the torso region, adjusted by the adjustment factor calculated in step S20. The adjustment factor of the neck region gradually becomes closer to the adjustment factor of the face region near the boundary with the face region, and closer to the adjustment factor of the torso region near the boundary with the torso region, such that the outline of the neck region is expressed by a smooth quadratic curve.

Next, the control unit 23 makes the projector 24 perform projection (content display) on the basis of the image of the object to be displayed, for which the sizes of the face region, neck region, and torso region have been adjusted, and also makes the voice output unit 33 output voice content on the basis of voice data stored in the voice data storage unit 253 (step S23).

Specifically, positional information about the human being region (a region that combines the adjusted face region, neck region, and torso region) of the image of the object to be displayed is outputted to the projector 24, and the human being region of the image of the object to be displayed is projected (displayed) onto the image display unit 27 by the projector 24. The control unit 23 synthesizes a voice on the basis of text data expressing voice content stored in the voice data storage unit 253, which is outputted by the voice output unit 33. The image of the object to be displayed is processed and projected (displayed) onto the image display unit 27 by the projector 24 such that the displayed human being lip-syncs along with the voice on the basis of the text data stored in the voice data storage unit 253. The image processing for the voice synthesis and lip-syncing can be performed using well-known techniques.

After content reproduction has ended and a prescribed amount of time has passed, the control circuit 23 returns to step Sl.

As explained above, according to the digital signage device 1, the control unit 23 extracts the face region and torso region from an image of the object to be displayed containing the human being to be displayed, compares the extracted face region and torso region to a face region and torso region of a screen display area extracted from a screen image of the image display unit 27, and then calculates, on the basis of these comparison results, a first adjustment factor for adjusting the size of the face region and a second adjustment factor for adjusting the size of the torso region in the image of the object to be displayed. The control circuit 23 separately adjusts the sizes of the face region and the torso region in the image of the object to be displayed on the basis of the calculated first adjustment factor and second adjustment factor, and causes the adjusted image to be displayed on the image display unit 27.

Accordingly, the sizes of the face region and torso region in the image of the object to be displayed are separately adjusted in accordance with the face region 27*a* and the torso region 27*a* in the image display unit 27 being used; therefore, even if the image of the object to be displayed does not match the shape of the image display unit 27, the respective regions can be adjusted to sizes that match the regions of the image display unit 27, thereby allowing for a display on the display area of the image display unit 27 that is as proportionate as possible.

Specifically, a first adjustment factor and second adjustment factor are calculated to be the largest size possible at which the face region and torso region in the image of the object to be displayed do not protrude from the frame region 27*a* and the torso region 27*c* on the image display unit 27, thereby allowing for a display on the display area of the image display unit 27 that is as proportionate as possible for each region.

A plurality of screen images for the image display unit 27 are stored, and the adjustment factors for the respective regions in the image of the object to be displayed are calculated on the basis of the configured screen images on the image display unit 27; thus, even if the image screen unit 27 changes, it is possible to perform a display that is as proportionate as possible on the display area of the image display unit 27 in use.

The adjustment factor of the neck region in the image of the object to be displayed is calculated as the average value of the adjustment factor of the face region and the adjustment factor of the torso region, and the size of the neck region is adjusted even further on the basis of the calculated adjustment factor; therefore, it is possible to adjust the neck region, which is the connection part between the face region and the torso region, in accordance with the adjustment sizes of the face region and the torso region. The size of the center of the neck region, which borders the face region and the torso region, is adjusted by the factor of the average value described above, and the factor that adjusts the size of the neck region becomes closer to the adjustment factor of the face region or torso region near the boundary with the face region or torso region, thereby making it possible to connect the neck region to the face region and torso region in a way that appears natural.

The content in the present embodiment as described above is one preferable example of the digital signage device according to one aspect of the present invention, and the present invention is not limited to this.

In the embodiment described above, an example was described in which display area information for a plurality of switchable image display units 27 are stored in advance in the display area information storage unit 254, and the display area information of the image display unit 27 in use is read out to the memory and used for calculate of the adjustment factors, for example. However, the projector 24 may have an imaging unit (not shown) that illuminates image display unit 27 used for projection from behind and captures the shape thereof from behind the image display unit 27, with the obtained image being stored in the memory by the control unit 23 and used for calculation of the adjustment factors, for example. With this configuration, it is possible to switch and use the image display units 27 without registering the display area information in advance, thereby improving convenience.

In the embodiment described above, an example is described in which the image of the object to be displayed is a human being, the screen is a human shape, the first region is a face region, the second region is a torso region, and the third region is a neck region, but the present invention is applicable and can exhibit similar effects if the image of the object to be displayed is an animal, character, or the like able to be divided into a plurality of regions, for example, and is not restricted to the examples described above.

In the embodiment described above, an example is described in which one aspect of the present invention is applied to a digital signage device that displays images by projecting the images onto a screen, but the present invention is applicable and can exhibit similar effects even if applied to a liquid crystal display, a plasma display, or other display devices, for example, and is not limited to these examples.

Other detailed configurations and detailed operations of the respective devices constituting the digital signage device can also be appropriately modified without departing from the spirit of the invention.

Several embodiments of the present invention were described, but the scope of the present invention is not limited to these, and includes the scope of the invention as described in the claims and the equivalents thereto.

It will be apparent to those skilled in the art that various modification and variations can be made in the present invention without departing from the spirit or scope of the invention.

Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A display device, comprising:
    a display unit having at least a first display area and a second display area;
    a storage unit that stores display area information for specifying respective shapes and sizes of the first display area and the second display area of the display unit; and
    a control unit connected to the display unit and the storage unit, said control unit configured to:
        extract a first region and a second region respectively corresponding to the first display area and the second display area from an image of an object to be displayed by the display unit;
        compare the first region and the second region extracted from the image of the object to be displayed to the first display area and the second display area specified on the basis of the display area information, the control unit calculating, on the basis of this comparison, a first adjustment factor for adjusting a size of the first region and a second adjustment factor for adjusting a size of the second region;
        adjust the respective sizes of the first region and the second region of the image of the object to be displayed in accordance with the calculated first adjustment factor and the second adjustment factor; and
        cause the display unit to display the adjusted image of the object to be displayed,
    wherein the display device further comprises:
        a plurality of the display units;
        an imaging unit that photographs the respective display areas of the display unit that will be used among the plurality of display units; and
        an auxiliary unit that stores a captured image that has been photographed by the imaging unit in the storage unit as the display area information.

2. The display device according to claim 1, wherein the control unit calculates the first adjustment factor and the second adjustment factor such that, when the image of the object to be displayed is displayed by the display unit, the first region and the second region of said image of the object to be displayed are a largest size possible without respectively protruding from the first display area and the second display area.

3. A display device, comprising:
    a display unit having at least a first display area and a second display area;
    a storage unit that stores display area information for specifying respective shapes and sizes of the first display area and the second display area of the display unit; and
    a control unit connected to the display unit and the storage unit, said control unit configured to:
        extract a first region and a second region respectively corresponding to the first display area and the second display area from an image of an object to be displayed by the display unit;
        compare the first region and the second region extracted from the image of the object to be displayed to the first display area and the second display area specified on the basis of the display area information, the control unit calculating, on the basis of this comparison, a first adjustment factor for adjusting a size of the first region and a second adjustment factor for adjusting a size of the second region;
        adjust the respective sizes of the first region and the second region of the image of the object to be displayed in accordance with the calculated first adjustment factor and the second adjustment factor; and
        cause the display unit to display the adjusted image of the object to be displayed;
    wherein the image of the object to be displayed has a third region that connects the first region to the second region,
    wherein the display unit has a third display area corresponding to said third region, and
    wherein the control unit is configured to:
        extract said third region from the image of the object to be displayed,
        calculate a third adjustment factor on the basis of the first adjustment factor and the second adjustment factor, said third adjustment factor being for adjusting a size of the third region, and
        adjust the respective sizes of the first region, the second region, and the third region of the image of the object to be displayed on the basis of the calculated first adjustment factor, the second adjustment factor, and the third adjustment factor, and
    wherein the third adjustment factor is calculated as an average value of the first adjustment factor and the second adjustment factor.

4. The display device according to claim 3, further comprising:
    a plurality of the display units, said plurality of display units capable of being switched;
    a display area information storage unit that stores display area information for each of the plurality of display units;
    a settings unit that configures the display units that will be used among the plurality of display units; and
    an auxiliary unit that reads the display area information of the configured display units from the display area information stored in the display area information storage unit and stores said display area information in the storage unit.

5. A display device, comprising:
    a display unit having at least a first display area and a second display area;
    a storage unit that stores display area information for specifying respective shapes and sizes of the first display area and the second display area of the display unit; and
    a control unit connected to the display unit and the storage unit, said control unit configured to:
        extract a first region and a second region respectively corresponding to the first display area and the second display area from an image of an object to be displayed by the display unit;
        compare the first region and the second region extracted from the image of the object to be displayed to the first display area and the second display area specified on the basis of the display area information, the control unit calculating, on the basis of this comparison, a first adjustment factor for adjusting a size of the first region and a second adjustment factor for adjusting a size of the second region;
        adjust the respective sizes of the first region and the second region of the image of the object to be displayed in accordance with the calculated first adjustment factor and the second adjustment factor; and cause the display unit to display the adjusted image of the object to be displayed, wherein the image of the object to be displayed is a human being, wherein the first display area and the second display area of the display unit are formed in a human shape, and wherein the first region is a face region and the second region is a torso region.

6. The display device according to claim 5, further comprising:

a plurality of the display units, said plurality of display units capable of being switched;

a display area information storage unit that stores display area information for each of the plurality of display units;

a settings unit that configures the display units that will be used among the plurality of display units; and an auxiliary unit that reads out the display area information of the configured display units from the display area information stored in the display area information storage unit and stores said display area information in the storage unit.

7. A display device, comprising:

a display unit having at least a first display area and a second display area;

a storage unit that stores display area information for specifying respective shapes and sizes of the first display area and the second display area of the display unit; and a control unit connected to the display unit and the storage unit, said control unit configured to:

extract a first region and a second region respectively corresponding to the first display area and the second display area from an image of an object to be displayed by the display unit;

compare the first region and the second region extracted from the image of the object to be displayed to the first display area and the second display area specified on the basis of the display area information, the control unit calculating, on the basis of this comparison, a first adjustment factor for adjusting a size of the first region and a second adjustment factor for adjusting a size of the second region;

adjust the respective sizes of the first region and the second region of the image of the object to be displayed in accordance with the calculated first adjustment factor and the second adjustment factor; and cause the display unit to display the adjusted image of the object to be displayed;

wherein the image of the object to be displayed has a third region that connects the first region to the second region, wherein the display unit has a third display area corresponding to said third region, and wherein the control unit is configured to:

extract said third region from the image of the object to be displayed, calculate a third adjustment factor on the basis of the first adjustment factor and the second adjustment factor, said third adjustment factor being for adjusting a size of the third region, and adjust the respective sizes of the first region, the second region, and the third region of the image of the object to be displayed on the basis of the calculated first adjustment factor, the second adjustment factor, and the third adjustment factor, wherein the image of the object to be displayed is a human being, wherein the first display area, the second display area, and the third display area of the display unit are formed in a human shape, and wherein the first region is a face region, the second region is a torso region, and the third region is a neck region.

8. The display device according to claim 7, further comprising:

a plurality of the display units, said plurality of display units capable of being switched;

a display area information storage unit that stores display area information for each of the plurality of display units;

a settings unit that configures the display units that will be used among the plurality of display units; and an auxiliary unit that reads out the display area information of the configured display units from the display area information stored in the display area information storage unit and stores said display area information in the storage unit.

9. A method of display for a display device equipped with a display unit having at least a first display area and a second display area, the method comprising:

storing display area information for specifying respective shapes and sizes of the first display area and the second display area of the display unit;

extracting a first region and a second region respectively corresponding to the first display area and the second display area from an image of an object to be displayed by the display unit;

calculating a first adjustment factor for adjusting a size of the first region and a second adjustment factor for adjusting a size of the second region, said calculating being performed on the basis of a comparison in which the first region and the second region extracted from the image of the object to be displayed are compared to the first display area and the second display area specified on the basis of the display area information;

adjusting the respective sizes of the first region and the second region of the image of the object to be displayed in accordance with the calculated first adjustment factor and the second adjustment factor; and causing the display unit to display the image of the object to be displayed that has been adjusted, wherein the display device further comprises a plurality of the display units, and the method further comprises:

photographing the respective display areas of the display unit that will be used among the plurality of display units by an imaging unit; and storing a captured image that has been photographed by the imaging unit in the storage unit as the display area information.

10. A method of display for a display device equipped with a display unit having at least a first display area, a second display area, and a third display area that connects the first display area to the second display area, the method comprising:

storing display area information for specifying respective shapes and sizes of the first display area and the second display area of the display unit;

extracting a first region, a second region, and a third region, respectively corresponding to the first display area, the second display area, and the third display area from an image of the object to be displayed by the display unit;

calculating a first adjustment factor for adjusting a size of the first region and a second adjustment factor for adjusting a size of the second region, said calculating being performed on the basis of a comparison in which the first region and the second region extracted from the image of the object to be displayed are compared to the first display area and the second display area specified on the basis of the display area information;

calculating a third adjustment factor for adjusting a size of the third region as an average value of the first adjustment factor and the second adjustment factor;

adjusting the respective sizes of the first region, the second region and the third region of the image of the object to be displayed in accordance with the calculated first adjustment factor, the second adjustment factor, and the third adjustment factor; and causing the display unit to display the image of the object to be displayed that has been adjusted.

11. A method of display for a display device equipped with a display unit having at least a first display area and a second display area, wherein the first display area and the second display area of the display unit are formed in a human shape, the method comprising:

storing display area information for specifying respective shapes and sizes of the first display area and the second display area of the display unit;

extracting a first region and a second region respectively corresponding to the first display area and the second display area from an image of the object to be displayed by the display unit, wherein the image of the object to be displayed is a human being, the first region is a face region, and the second region is a torso region;

calculating a first adjustment factor for adjusting a size of the first region and a second adjustment factor for adjusting a size of the second region, said calculating being performed on the basis of a comparison in which the first region and the second region extracted from the image of the object to be displayed are compared to the first display area and the second display area specified on the basis of the display area information;

adjusting the respective sizes of the first region and the second region of the image of the object to be displayed in accordance with the calculated first adjustment factor and the second adjustment factor; and causing the display unit to display the image of the object to be displayed that has been adjusted, wherein the image of the object to be displayed is a human being, wherein the first display area and the second display area of the display unit are formed in a human shape, and wherein the first region is a face region and the second region is a torso region.

12. A method of display for a display device equipped with a display unit having at least a first display area, a second display area, and a third display area that connects the first display area to the second display area, wherein the first display area, the second display area, and the third display area of the display unit are formed in a human shape, the method comprising:

storing display area information for specifying respective shapes and sizes of the first display area and the second display area of the display unit;

extracting a first region, a second region, and a third region, respectively corresponding to the first display area, the second display area, and the third display area from an image of the object to be displayed by the display unit, wherein the image of the object to be displayed is a human being, the first region is a face region, the second region is a torso region, and the third region is a neck region;

calculating a first adjustment factor for adjusting a size of the first region and a second adjustment factor for adjusting a size of the second region, said calculating being performed on the basis of a comparison in which the first region and the second region extracted from the image of the object to be displayed are compared to the first display area and the second display area specified on the basis of the display area information;

calculating a third adjustment factor for adjusting a size of the third region on the basis of the first adjustment factor and the second adjustment factor;

adjusting the respective sizes of the first region, the second region and the third region of the image of the object to be displayed in accordance with the calculated first adjustment factor, the second adjustment factor, and the third adjustment factor; and causing the display unit to display the image of the object to be displayed that has been adjusted.

* * * * *